UNITED STATES PATENT OFFICE.

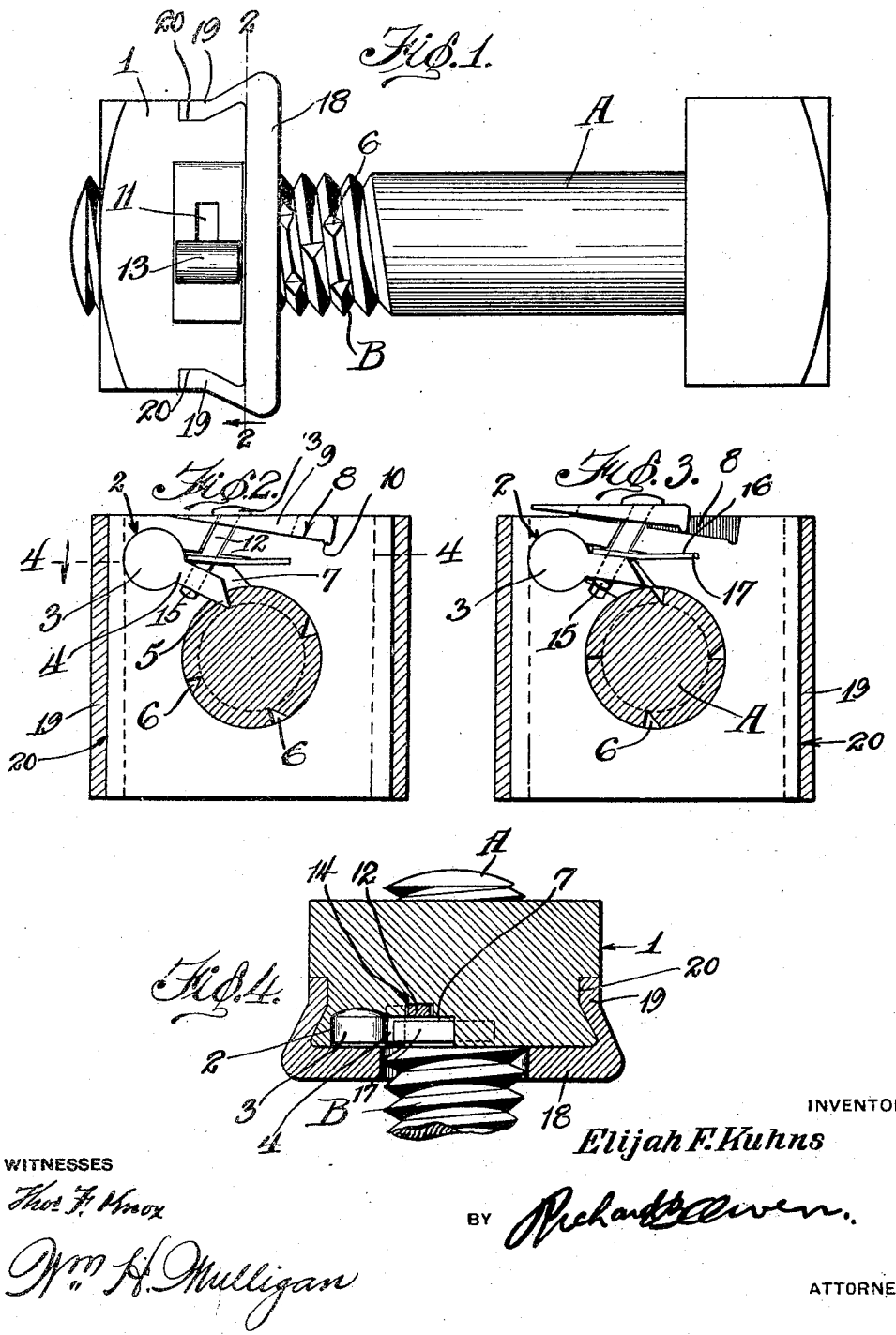

ELIJAH F. KUHNS, OF COLUMBUS, KANSAS.

NUT-LOCK.

1,212,074.  Specification of Letters Patent.  Patented Jan. 9, 1917.

Application filed May 25, 1916. Serial No. 99,858.

*To all whom it may concern:*

Be it known that I, ELIJAH F. KUHNS, a citizen of the United States, residing at Columbus, in the county of Cherokee and State of Kansas, have invented certain new and useful Improvements in Nut-Locks, of which the following is a specification.

This invention relates to nut-locks and more particularly to a nut having means adapted to be manually released whereby the nut may be mounted upon a bolt and which may be manually placed in operative position for preventing the nut from being accidentally displaced from the threads of the bolt upon which it is screw threadedly mounted.

A further object of the invention is a provision of a nut of this character, the locking mechanism of which is mounted in recesses formed in one face of the nut and having detachable means for retaining the mechanism in its proper place within the recesses.

A further object of this invention is the provision of a nut-lock which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which, Figure 1 is a side elevation showing the nut-lock mounted upon a bolt. Fig. 2 is a section on the line 2—2 of Fig. 1 showing the locking mechanism in operative position. Fig. 3 is a similar view showing the locking mechanism in inoperative position. Fig. 4 is a transverse section on the line 4—4 of Fig. 2.

The bolt A has its shank provided with the usual screw threads B upon which the nut, designated in its entirety by the numeral 1, is screw threadedly mounted. As shown in the drawing the nut is of square formation but I desire it to be understood that the locking mechanism hereinafter described may be mounted on any shape nut. Formed in one corner of the bottom face of the nut is a circular recess 2 in which the circular disk 3 is mounted. The circular disk 3 is designed to constitute the head of a locking latch 4 which is provided with a point 5 for engaging the notches 6 formed at various points on the thread B. The recess 2 in which the disk 3 is mounted opens into a passage-way 7, the passage-way forming communication with the central screw threaded bore of the nut whereby the latch 4 may extend inwardly for communicating with the bolt.

One side of the nut has a wedge-shaped recess 8 and the recess is open at its edge where it joins the bottom face of the nut. A wedge 9 is disposed within the recess 8 and its large end carries a depending tongue 10 adapted to fit in a groove formed in the bottom of the large portion of the wedge-shaped recess. The wedge 9 has a longitudinally extending slot 11 through which the shank 12 of an operating lever extends, the end of the lever carrying an enlarged head 13 which bears upon the top face of the wedge. The lower end of the lever 12 is slidably mounted in a recess 14 which, as shown by Fig. 4 of the drawing, is of a depth greater than the depth of the passage-way 7 whereby the lower end of the lever may be disposed behind the latch 4. The end of the lever is bent outwardly at right angles to provide the hook 15, which catches the end of the latch 4 for raising the latch when the locking mechanism is operated for placing the latch in inoperative position. A flat spring 16 is secured in a groove 17 and extends into the recess 7 where it resiliently engages the latch 4 for holding the latch normally in operative position. It will be noticed that the recess 14 is disposed at an angle and establishes communication between the passage-way 7 and the wedge-shaped recess 8.

For holding the mechanism in its proper place and for preventing the accidental displacement of any parts of the mechanism I provide a retaining plate 18 which rests against the bottom face of the nut and is provided with a central circular aperture whereby the shank of the bolt may be extended into the central bore of the nut. Retaining tongues 19, carried by opposite sides of the retaining plate, are adapted to fit into grooves 20 formed in the sides of the nut for allowing the plate 18 to be removed from the nut after the nut is removed from the bolt.

By referring to Fig. 2 of the drawing it will be observed that the mechanism, by virtue of the latch registering with one of the notches in the threads of the bolt, is in operative position. By pushing the wedge out of the wedge-shaped recess as indicated by Fig. 3 of the drawing, the operating lever 12 will be caused to raise and the hook 15 which is disposed under the latch 4 will raise the latch out of engagement with the notch 6 and allow the nut to be rotated for removing it from the bolt. The tendency of the flat spring 16 is to normally hold the latch in operative position. Thus, when the mechanism is being placed back into operative position the latch will be forced into engagement with the bolt where it will register with one of the notches 6 for holding the nut in locked position.

In reduction to practice I have found that the form of my invention illustrated in the drawings and referred to in the above description, as the preferred embodiment, is the most efficient and practicable; yet realizing that the conditions concurrent with the adoption of my device will necessarily vary, I desire to emphasize the fact that various minor changes in the details of construction, proportion and arrangement of parts may be resorted to, when required, without sacrificing any of the advantages of my invention, as defined in the appended claims.

I claim:

1. A combination with a bolt having a nut screw threadedly mounted, the threads on the bolt having a plurality of notches, a rotatable locking element carried by the nut and adapted to register with one of said notches, an operating lever connected to said locking element and extending outwardly at the side of said nut, and means associated with the said operating lever and slidably mounted on the nut for imparting movement to said operating lever whereby said locking element may be rotated.

2. A combination with a bolt having a nut screw threadedly mounted, the threads on the bolt having a plurality of notches, a rotatable locking element carried by the nut and adapted to register with one of said notches, an operating lever connected to said locking element and extending outwardly at the side of said nut, wedging means slidably mounted on the nut and connected to the said operating lever, the said lever having a head engaging said wedging means for preventing the said means from being displaced from said nut.

3. A combination with a bolt and a nut mounted upon the bolt, the said bolt having a plurality of notches formed in its threads, a circular disk rotatably mounted in the nut and provided with a latch for registration with one of the notches in the threads of the bolt, a wedge slidably mounted on the nut, said nut having a recess formed in one side for the reception of said wedge, an operating lever connected to the said latch and engaging the said wedge, and a resilient member fixedly mounted on the nut and engaging the said latch for normally holding the latch in engagement with one of the said notches, the said wedge having a tongue formed at one end adapted to fit in a groove formed in the end of the said recess.

4. A combination with a bolt having screw threads formed on its shank, of a nut screw threadedly mounted upon said bolt and having a wedge-shaped recess formed in one of its sides, a wedge loosely mounted within said recess and provided with a longitudinally extending slot, locking means carried by said nut and adapted to engage said bolt, an operating lever disposed in a recess formed in said nut, said lever extending through the central longitudinal slot in said wedge, a head formed on one end of said lever and resting upon said wedge, and a hook carried by the opposite end of said lever and engaging said locking means.

5. A combination with a bolt having screw threads formed on its shank, of a nut screw threadedly mounted on said bolt, a wedge provided with a slot and disposed on the edge of said nut, a locking element rotatably mounted and adapted to register with one of a plurality of notches formed in the threads of said bolt, and an operating lever connected to said locking element and extending through the slot in said wedge, said lever provided with a head at its terminal for engaging said wedge.

6. A combination with a bolt having screw threads formed on its shank, of a nut screw threadedly mounted on said bolt, a wedge provided with a slot and disposed on the edge of said nut, a locking element rotatably mounted and adapted to register with one of a plurality of notches formed in the threads of said bolt, an operating lever connected to said locking element and extending through the slot in said wedge, said lever provided with a head at its terminal for engaging said wedge, and a spring element for normally holding said locking element in engagement with said bolt.

In testimony whereof I affix my signature in presence of two witnesses.

ELIJAH F. KUHNS.

Witnesses:
A. KUHNS,
H. H. TIPRENBACH.